(12) United States Patent
Sidoni

(10) Patent No.: US 6,814,486 B2
(45) Date of Patent: Nov. 9, 2004

(54) RETURN BEND TEMPERATURE SENSOR

(75) Inventor: John M Sidoni, St. Mary's, PA (US)

(73) Assignee: Advanced Thermal Products, Inc., St. Mary's, PA (US)

( * ) Notice: Subject to any disclaimer, the term of this patent is extended or adjusted under 35 U.S.C. 154(b) by 0 days.

(21) Appl. No.: 10/215,863

(22) Filed: Aug. 9, 2002

(65) Prior Publication Data
US 2004/0028118 A1 Feb. 12, 2004

(51) Int. Cl.[7] .................. G01K 1/14; G01K 1/08; G01K 7/00
(52) U.S. Cl. ............ 374/208; 374/147; 374/179; 374/185
(58) Field of Search ............... 374/179, 185, 374/147, 208; 24/459, 462, 293, 294, 295; 248/231.81, 316.7

(56) References Cited

U.S. PATENT DOCUMENTS

| | | | | |
|---|---|---|---|---|
| 1,381,826 A | * | 6/1921 | Hansen | 152/227 |
| 2,191,782 A | * | 2/1940 | Valane | 248/229.26 |
| 2,302,640 A | * | 11/1942 | Schmidt | 374/194 |
| 2,560,455 A | * | 7/1951 | Knight | 374/148 |
| 3,546,942 A | * | 12/1970 | Lewis | 374/194 |
| 3,779,079 A | * | 12/1973 | Snook | 374/165 |
| 4,091,672 A | * | 5/1978 | Amrine et al. | 374/147 |
| 4,297,668 A | * | 10/1981 | Place | 337/365 |
| 4,553,432 A | | 11/1985 | Barlian et al. | |
| 4,646,406 A | * | 3/1987 | Weiss et al. | 148/524 |
| 4,738,737 A | | 4/1988 | Runde et al. | |
| 4,870,722 A | * | 10/1989 | Shell, Jr. | 24/16 R |
| 4,951,902 A | * | 8/1990 | Hardtke | 248/74.1 |
| 5,074,516 A | * | 12/1991 | Lewis et al. | 248/691 |
| 5,307,543 A | * | 5/1994 | Krillenberger | 24/543 |
| 5,333,821 A | * | 8/1994 | Lee | 248/52 |
| 5,524,327 A | * | 6/1996 | Mickel et al. | 24/115 A |
| 5,707,151 A | * | 1/1998 | Parker et al. | 374/120 |
| 5,848,094 A | * | 12/1998 | Buhl et al. | 374/31 |
| 6,334,707 B1 | | 1/2002 | Ku | |
| 6,354,937 B1 | * | 3/2002 | Crook | 454/292 |
| 6,397,683 B1 | | 6/2002 | Hagenmeyer et al. | |
| 6,417,758 B1 | | 7/2002 | Russel et al. | |
| 6,550,962 B1 | * | 4/2003 | Yang et al. | 374/147 |
| 2001/0038059 A1 | * | 11/2001 | Dick et al. | 248/65 |
| 2002/0041621 A1 | * | 4/2002 | Faries et al. | 374/147 |
| 2002/0191673 A1 | * | 12/2002 | Lee | 374/141 |
| 2004/0056158 A1 | * | 3/2004 | Stuart et al. | 24/459 |

FOREIGN PATENT DOCUMENTS

| | | | | | |
|---|---|---|---|---|---|
| JP | 59184830 A | * | 10/1984 | | G01K/7/02 |
| JP | 04157275 A | * | 5/1992 | | F16L/3/08 |

* cited by examiner

Primary Examiner—Diego Gutierrez
Assistant Examiner—Mirellys Jagan
(74) Attorney, Agent, or Firm—Gary L. Bush; Andrews Kurth LLP

(57) ABSTRACT

A return bend temperature sensor configured to mount on a curved section of a tube. The sensor comprises a clip, the clip having a resilient arm with a contour for fitting over a curved section of pipe, and a mounting well for holding a thermal sensing device such as a thermistor, resistance temperature detector or thermocouple. The thermal sensing device is fitted into the mounting well with a thermally conductive epoxy. The outer surface of the clip is covered with molded plastic such that the clip can easily side over and grasp a curved section of tube commonly found in the return coil of a refrigeration coil.

6 Claims, 3 Drawing Sheets

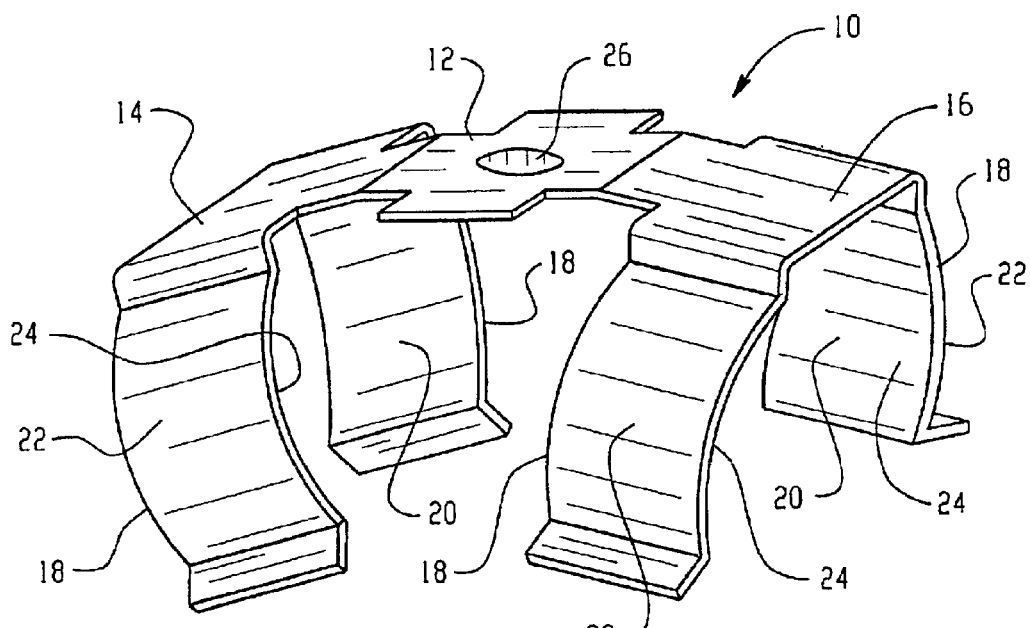
Fig. 1
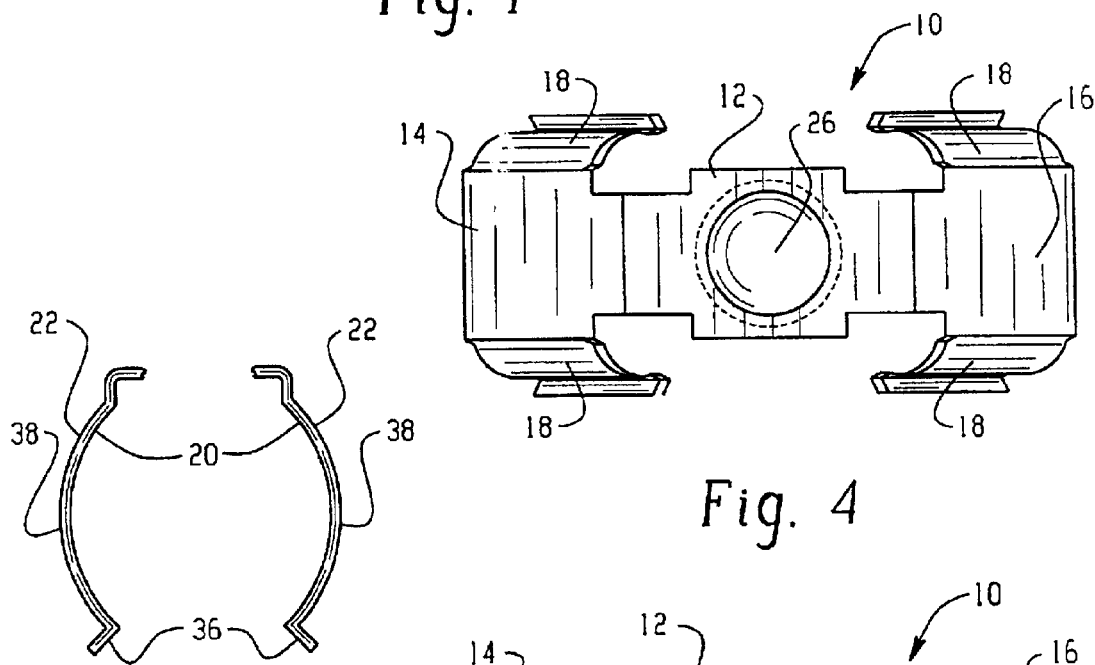
Fig. 2
Fig. 4
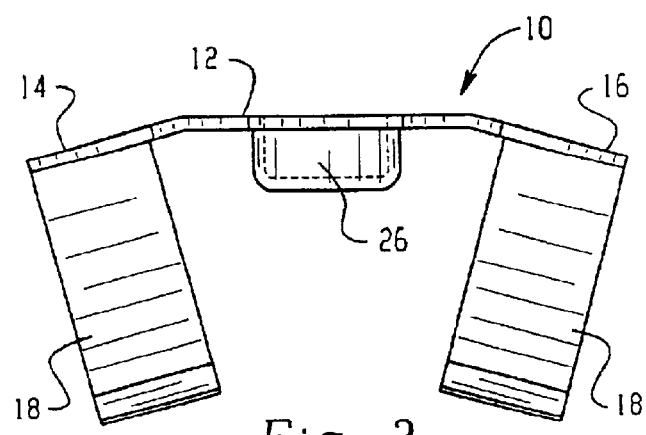
Fig. 3

RETURN BEND TEMPERATURE SENSOR

BACKGROUND OF THE INVENTION

The present invention relates generally to temperature sensing apparatuses and more particularly to a temperature sensing apparatus configured to measure the temperature of an Air Conditioning or refrigeration coil at a bend in the coil.

Manufacturers of air conditioners, chilled water units, and other refrigeration related products have a requirement to measure the temperature of fluids or gases as they flow through evaporator and condenser coils. Because the coils are surrounded by fins, it is desirable to measure temperature at the coil return bends. However, temperature sensing apparatuses to monitor refrigerant of coils use "clip-on" techniques to monitor the refrigerant of coils by attaching to straight copper tubes. These apparatuses comprise a clip and a thermal sensor wherein the sensor is held on to a straight section of tubing by the clip.

A problem with the present "clip-on" techniques is that they are not suitable for a return bend because the return bend has a one-hundred-eighty degree bend that prevents the clip from attaching firmly to the tubing. Another problem with the "clip-on" devices is that that they do not provide sufficient surface area contact to allow for good thermal coupling between the sensor and the bent tube.

Other sensing devices use a sensor in combination with metal straps instead of clips. For example, a strap is tightened onto the bend with a screw and nut or hose clamp. However, these devices are difficult to mount on the tube because of limited space between the return bends and end plates. Thus, a need exists for a temperature sensing apparatus configured to measure the measure the temperature of an Air Conditioning or refrigeration coil at a bend in the coil.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a clip for a return bend temperature sensor comprising a mounting base, at least one resilient arm extending from the base, the arm having a countered section adapted to mount onto a curved section of a tube, and a mounting well within the base. Typically, the clip would be comprised of a thermally conductive metal, such as for example copper, beryllium copper, or brass. The outer surface of the arms may be covered with molded rubber or plastic, for example a thermoplastic polyamide resin, so that the arms will be flexible enough to be shaped with the same contour of the bent tube, yet hard enough to retain its molded shape.

In another embodiment there is contemplated a return bend temperature sensor comprising a mounting clip and a sensing element. The mounting clip comprising a mounting base with a pair of thermally conductive metallic resilient arms extending from the mounting base in a substantially perpendicular direction from the base. Each of the resilient arms having an opposing inner contoured section adapted to mount onto a curved section of tubing. The base further comprising a mounting well wherein the thermal sensing with a thermally conductive epoxy is in the mounting well.

In yet another embodiment there is contemplated a return bend temperature sensor comprising attachment mean for clipping onto a curved section of tubing, the attachment means having a mounting well, and sensing means fitted into the mounting well for sensing the temperature of the curved section of tubing.

In still yet another embodiment there is contemplated a return bend temperature sensor comprising a clip with a mounting base, two pairs of thermally conductive metallic resilient arms extending from the mounting base, and a mounting well, and a sensing element with a thermally conductive epoxy fitted into the mounting well. The first pair of thermally conductive metallic resilient arms extend from a first end of the mounting base in a substantially perpendicular direction from the base. Each arm having an inner opposing contoured section adapted to mount onto a curved section of tube, and having an outer coating of molded plastic. The second pair of thermally conductive metallic resilient arms extend from a second end of the mounting base in a substantially perpendicular direction from the base. Each arm having an inner opposing contoured section adapted to mount onto a curved section of tube, and having an outer coating of molded plastic. The return sensor is suitably adapted such that the sensor is in thermal contact with the clip, and the sensor and clip are in thermal contact with the curved section of tube thereon.

One aspect of the present invention is that the sensor has a fast response time. This is because the sensing element is embedded in into the thermally conductive clip with thermally conductive epoxy and because there is a significant amount of the clip in direct contact with the bent tube, thus the temperature is efficiently transferred to the sensor. Another aspect of the present invention is that the invention allows an installer or field technician to easily attach the sensor to a bend in a tube in just a few seconds.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

In the drawings:

FIG. 1 is an isometric view of a clip contemplated by the present invention;

FIG. 2 is a side view of the resilient arms of the clip illustrated in FIG. 1;

FIG. 3 is a side view of the clip illustrated in FIG. 1;

FIG. 4 is a top view of the clip illustrated in FIG. 1;

DETAILED DESCRIPTION OF INVENTION

Throughout this description, the preferred embodiment and examples shown should be considered as exemplars, rather than limitations, of the present invention.

The present invention contemplates using a thermally conductive clip that is formed to snap over the top of a bend. The clip is a single piece with a small formed well that allows a sensor to be easily potted in the well with a thermally conductive epoxy. This facilitates maximum surface area contact between the clip and the tube, while at the same time having the sensor element in intimate contact with the tube. A specially formulated flexible material, such as a molded plastic, is then injection molded over the clip. This provides mechanical stability and strain relief for the sensor cable. At the same time, the material and clip are flexible enough to allow an installer to easily snap the unit into place.

The sensing element can be any sensing device that is small enough to fit in the well, including but not limited to thermistors, Resistance Temperature Detectors (RTDs) and thermocouples. While the clip shown herein is for ⅜" copper tubes, the clip can easily be modified to include other tube sizes.

Figure 5:
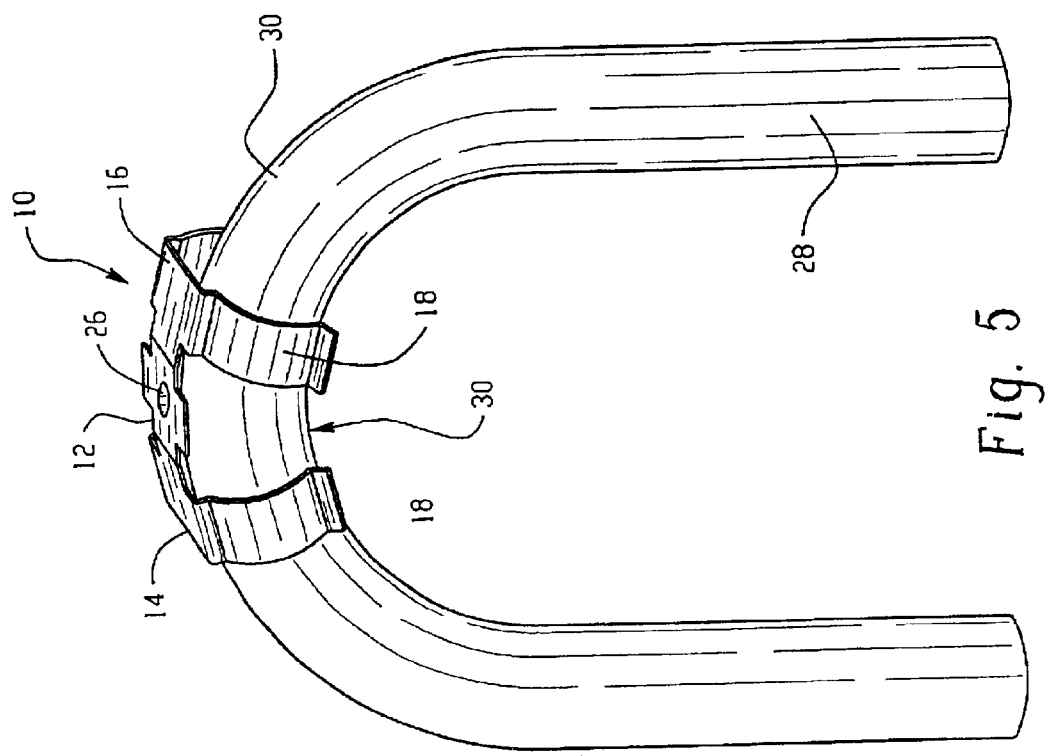
FIG. 5 is a perspective view showing a clip contemplated by the present invention mounted on a return bend or a curved section of a tube.

Referring now to the drawings there is shown in FIG. 1 a clip 10. the clip has a mounting base 12 with a first end 14 and a second end 16. Resilient extending arms 18 which are substantially perpendicular to the mounting base 12 are shown protruding from the curved mounting base 12. In the preferred embodiment, the mounting base 12 is curved so as to maximize contact with the tube 28 (FIG. 5). Other configurations of the mounting base are acceptable, however the angle of contact between the resilient arm and the base may have to be changed to maximize gripping and/or thermal contact between the clip and tube, and the sensor and tube.

The resilient extending arms 18 have an inner surface 20 and an outer surface 22. The inner side 20 has a contour 24 that is configured to the shape of the curved tube (not shown), preferably for the point of attachment. A sensor mount 26 is located in the base 12 of the clip 10 for holding the thermal sensing element.

Referring now to FIG. 2 there is shown a side view of the resilient arms of the preferred embodiment. Preferably, the inner surface 20 is comprised of a thermally conductive material 36, typically a metal such as for example copper, beryllium copper, or brass. The thermally conductive material 36 is then coated with molded plastic 38, such as for example a thermoplastic polyamide resin. The molded plastic 38 must bond well to the conductive material 36, hard enough to retain its shape while being flexible enough to be shaped with the contour of the bent tube 28 (FIG. 5). While the present invention may work with only one resilient arm 18, two arms with thermally conductive material 36 are preferred in order to maximize thermal contact between the clip 10 and the curved section 30 (FIG. 5) of the tube 28 (FIG. 5).

FIGS. 3 and 4 show the typical dimensions of a clip for use with a ⅜ inch tube. In this preferred embodiment, the distance between the ends of the clip are 1.07 inches, the height is 0.51 inches, and the width is 0.30 inches. These dimensions may be varied in order to adapt the clip to different size tubes. FIG. 5 shows an example of the clip 10 mounted on a tube 28 at a curved section or bend 30. The extensible arms 18 are configures such that the tube 28 fits within the contours 24 of the arms 18.

Figure 6:
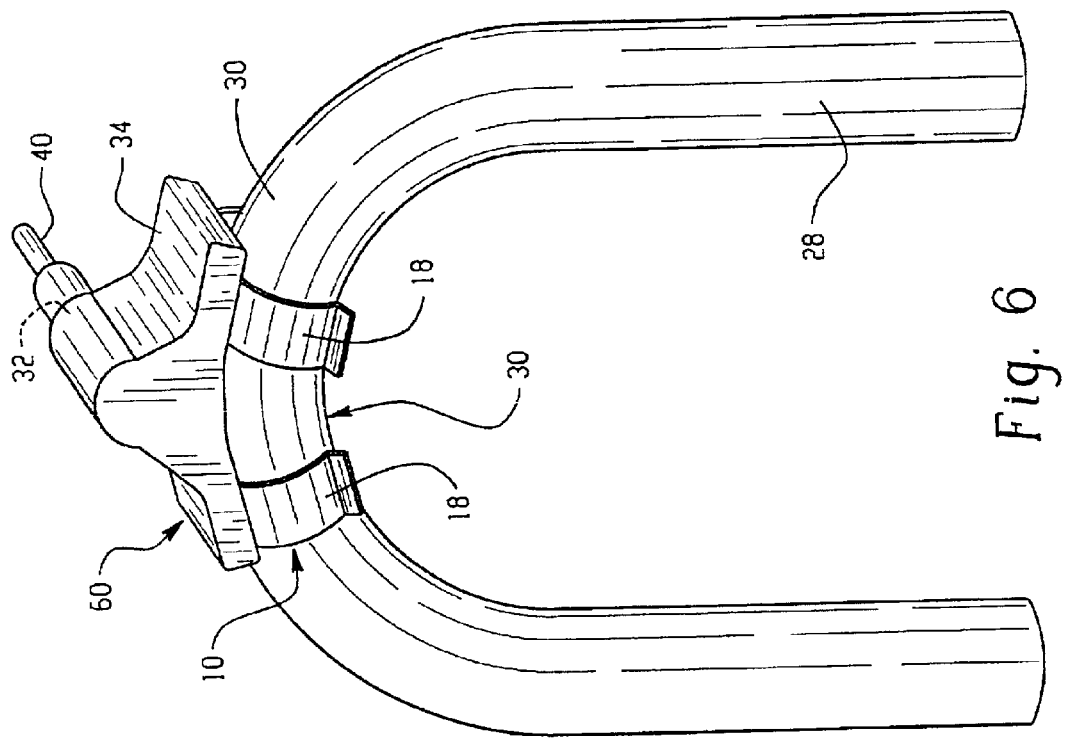
FIG. 6 is a perspective view showing a return bend temperature sensor mounted on a return bend or a curved section of a tube.

Referring now to FIG. 6, there is shown a return bend temperature sensor 60 wherein the extensible arms 18 of the clip 10 gripe a curves section 30 of tube 28. The return bend temperature sensor 60 further comprises a housing 34 which encases the sensing element (not shown) and has an opening 32 for attaching a cable assembly 40

Figure 7:
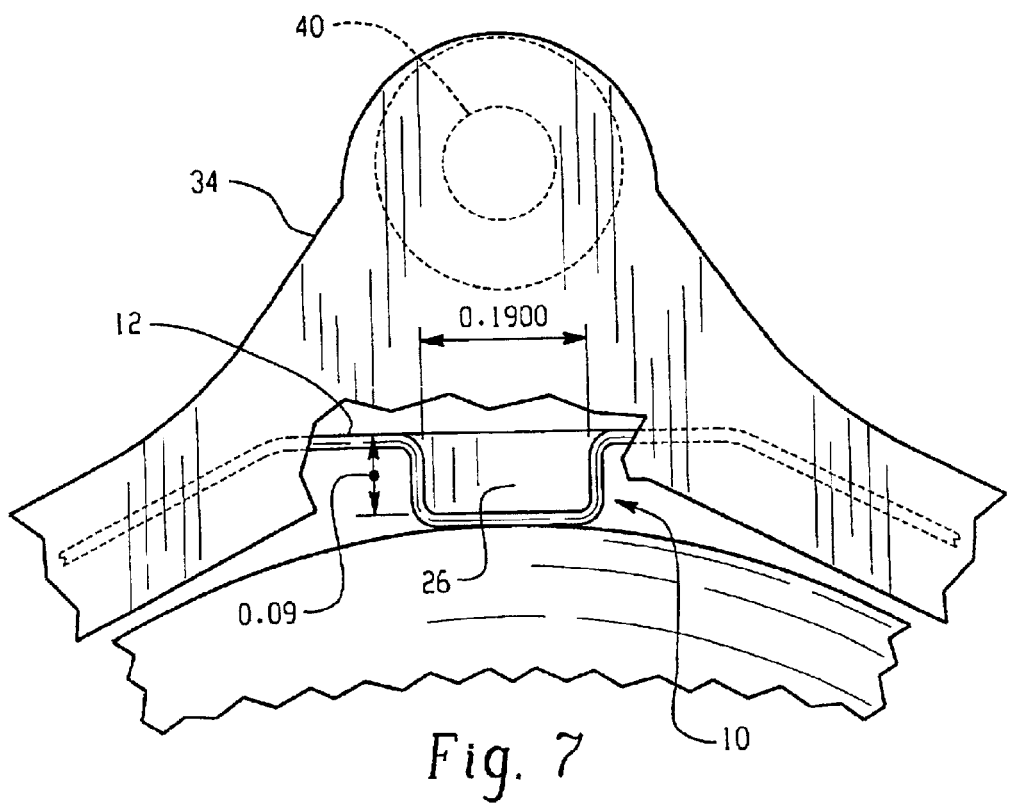
FIG. 7 is a detailed side view of the return bend temperature sensor further illustrating the clip's mounting well.

Referring to FIG. 7 there is shown a close up view of the clip 10 showing further detail of mounting well 26. As shown in FIG. 7, the mounting well 26 has a diameter of 0.1900 inches and a depth of 0.09 inches.

Figures 8, 9:
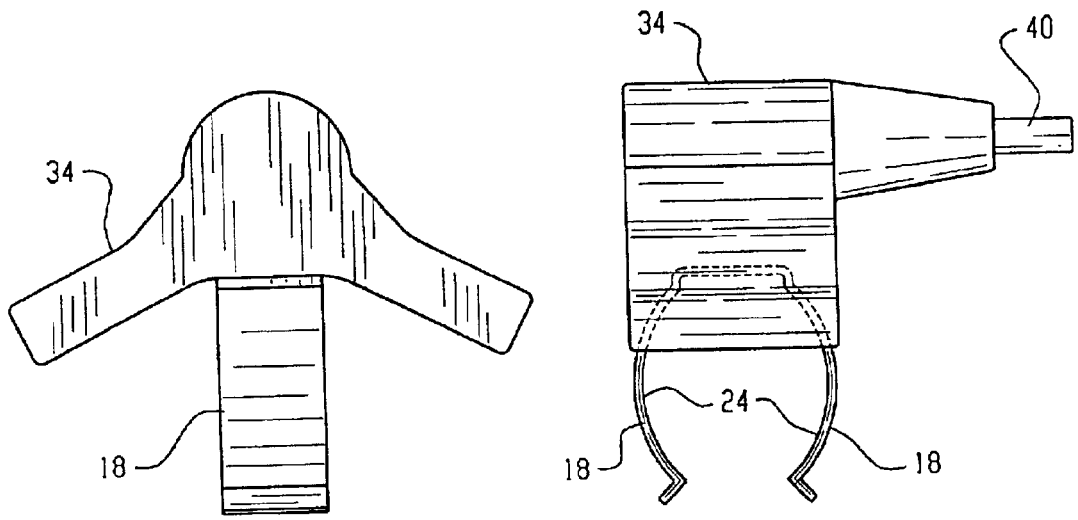
FIG. 8 is a first side view of a single clip embodiment of the return bend temperature sensor of the present invention.
FIG. 9 is a second side view of a single clip embodiment of the return bend temperature sensor of the present invention.

Referring now to FIGS. 8 and 9 there is shown an embodiment wherein a single pair of resilient arms 18 are used to grasp the tube (not shown).

While the invention as described herein is directed to a temperature sensing apparatus for ⅜" copper return bends, as those readily skilled in the art can readily appreciate the present invention may be adapted to any size bend.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A return bend temperature sensor, comprising:

a mounting base (12) having first and second opposite ends and a center portion disposed therebetween, said center portion characterized by being generally planar and having a mounting well (26) disposed therein said first end (14) characterized by being generally planar and not parallel to said generally planar center portion, said second end (16) characterized by being generally planar and not parallel to said generally planar center portion nor parallel to said generally planar first end, a first pair of thermally conductive metallic resilient arms extending from said first end of the mounting base, each arm of said first pair having an opposing inner contoured section adapted to mount onto a curved section of tubing, a second pair of thermally conductive metallic resilient arms extending from said second end of the mounting base, each arm of said second pair having an opposing inner contoured section adapted to mount onto a curved section of tubing, and a sensing element with a thermally conductive epoxy in the mounting well, wherein, said first pair and said second pair of resilient arms have inner surfaces and outer surfaces, said outer surfaces comprising molded plastic.

2. A return bend temperature sensor, comprising:

a mounting base (12) having first and second opposite ends and a center portion disposed therebetween, said center portion characterized by being generally planar and having a mounting well (26) disposed therein, said first end (14) characterized by being generally planar and not parallel to said generally planar center portion, said second end (16) characterized by being generally planar and not parallel to said generally planar center portion nor parallel to said generally planar first end, a first pair of thermally conductive metallic resilient arms extending from said first end of the mounting base, each arm of said first pair having an opposing inner contoured section adapted to mount onto a curved section of tubing, a second pair of thermally conductive metallic resilient arms extending from said second end of the mounting base, each arm of said second pair having an opposing inner contoured section adapted to mount onto a curved section of tubing, and a sensing element with a thermally conductive epoxy in the mounting well, wherein, the sensing element is selected from a group consisting of a thermistor, a resistance temperature detector, and a thermocouple.

3. A return bend temperature sensor, comprising:

a mounting base (12) having first and second opposite ends and a center portion disposed therebetween, said center portion characterized by being generally planar and having a mounting well (26) disposed therein, said first end (14) characterized by being generally planar and not parallel to said generally planar center portion, said second end (16) characterized by being generally planar and not parallel to said generally planar center portion nor parallel to said generally planar first end, a first pair of thermally conductive metallic resilient arms extending from said first end of the mounting base, each arm of said first pair having an opposing inner contoured section adapted to mount onto a curved section of tubing, a second pair of thermally conductive metallic resilient arms extending from said second end of the mounting base, each arm of said second pair having an opposing inner contoured section adapted to mount onto a curved section of tubing, and a sensing element with a thermally conductive epoxy in the mounting well, the return bend temperature sensor further comprising, a housing formed of molded plastic enclosing the sensing element.

4. A return bend temperature sensor, comprising:

a clip, the clip further comprising, a metallic mounting base (12) having first and second opposite ends and a center portion disposed therebetween, said center portion characterized by being generally planar and having a mounting well (26) disposed therein, said first end (14) characterized by being generally planar and not parallel to said generally planar center portion, said second end (16) characterized by being generally planar and not parallel to said generally planar center portion nor parallel to said generally planar first end, a first pair of thermally conductive metallic resilient arms extending from the first opposite end of the mounting base in a substantially perpendicular direction from the first end, each arm having an opposing inner contoured section adapted to mount onto a curved section of tube therein and an outer covering comprising molded plastic, a second pair of thermally conductive metallic resilient arms extending from the second opposite end of the mounting base in a substantially perpendicular direction from the second end, each arm of said second pair having an inner opposing contoured section adapted to mount onto a curved section of tube and an outer covering comprising molded plastic; and a sensing element with a thermally conductive epoxy fitted into the mounting well therein, wherein the sensor is in thermal contact with the clip, and the sensor and clip are in thermal contact with the curved section of a tube.

5. The return bend temperature sensor as in claim 4 further comprising a housing formed of molded plastic enclosing the sensing element and mounted on the mounting base in a direction opposite the first pair of thermally conductive metallic resilient arms and the second pair of thermally conductive metallic resilient arms.

6. The return bend temperature sensor as in claim 4 wherein the sensing element is selected from the group consisting of a thermistor, a resistance temperature detector, and a thermocouple.

* * * * *

UNITED STATES PATENT AND TRADEMARK OFFICE
CERTIFICATE OF CORRECTION

PATENT NO. : 6,814,486 B2
DATED : November 9, 2004
INVENTOR(S) : John M. Sidoni

It is certified that error appears in the above-identified patent and that said Letters Patent is hereby corrected as shown below:

Column 6,
Line 28, in both instances delete "sensor", and insert -- sensing element --

Signed and Sealed this

Twenty-second Day of March, 2005

JON W. DUDAS
*Director of the United States Patent and Trademark Office*